Figure 1:
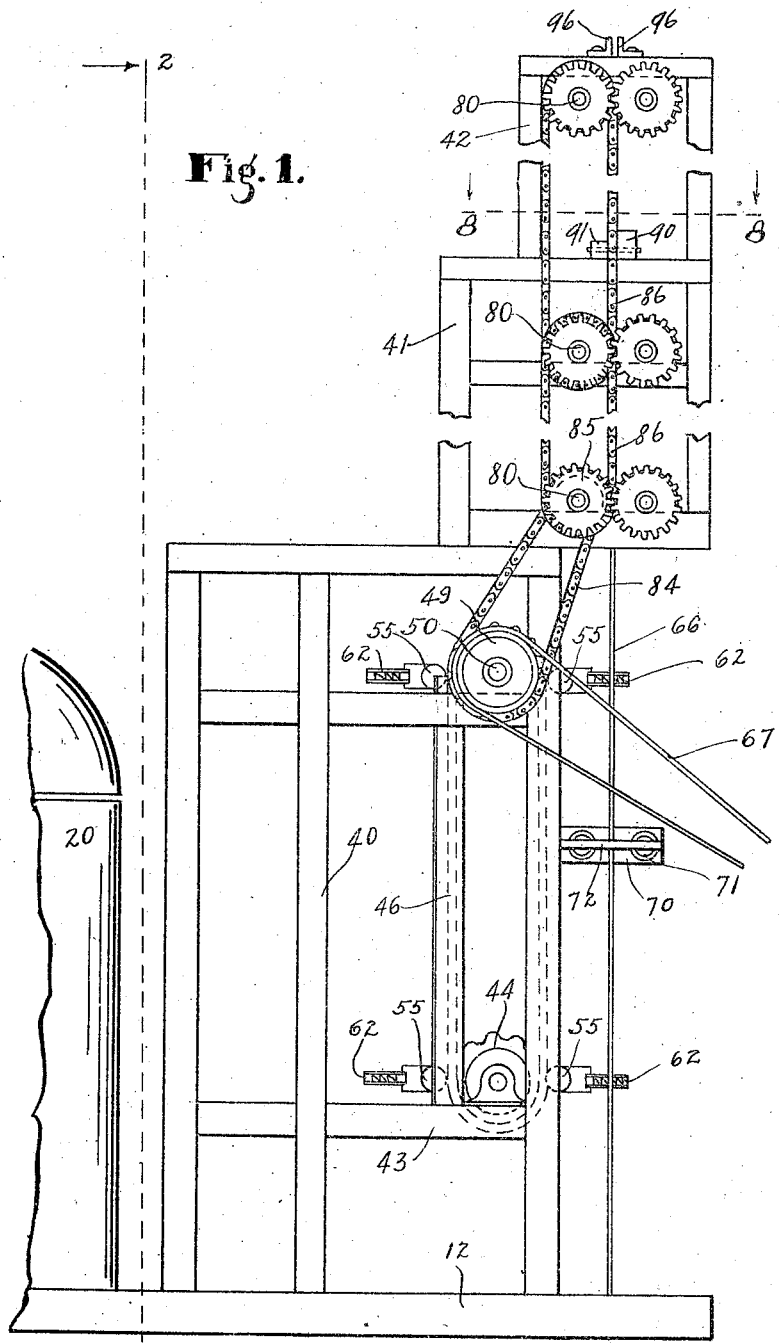

L. A. THORNBURG.
CONTINUOUS DRAWN SHEET GLASS MACHINE.
APPLICATION FILED SEPT. 5, 1907.

956,449.

Patented Apr. 26, 1910.
5 SHEETS—SHEET 1.

WITNESSES:

INVENTOR.
Lincoln A. Thornburg
BY
ATTORNEY.

L. A. THORNBURG.
CONTINUOUS DRAWN SHEET GLASS MACHINE.
APPLICATION FILED SEPT. 5, 1907.

956,449.

Patented Apr. 26, 1910.
5 SHEETS—SHEET 2.

WITNESSES:
J. H. Swan.
Olive Breeden

INVENTOR.
Lincoln A Thornburg,
BY
V. H. Lockwood
ATTORNEY.

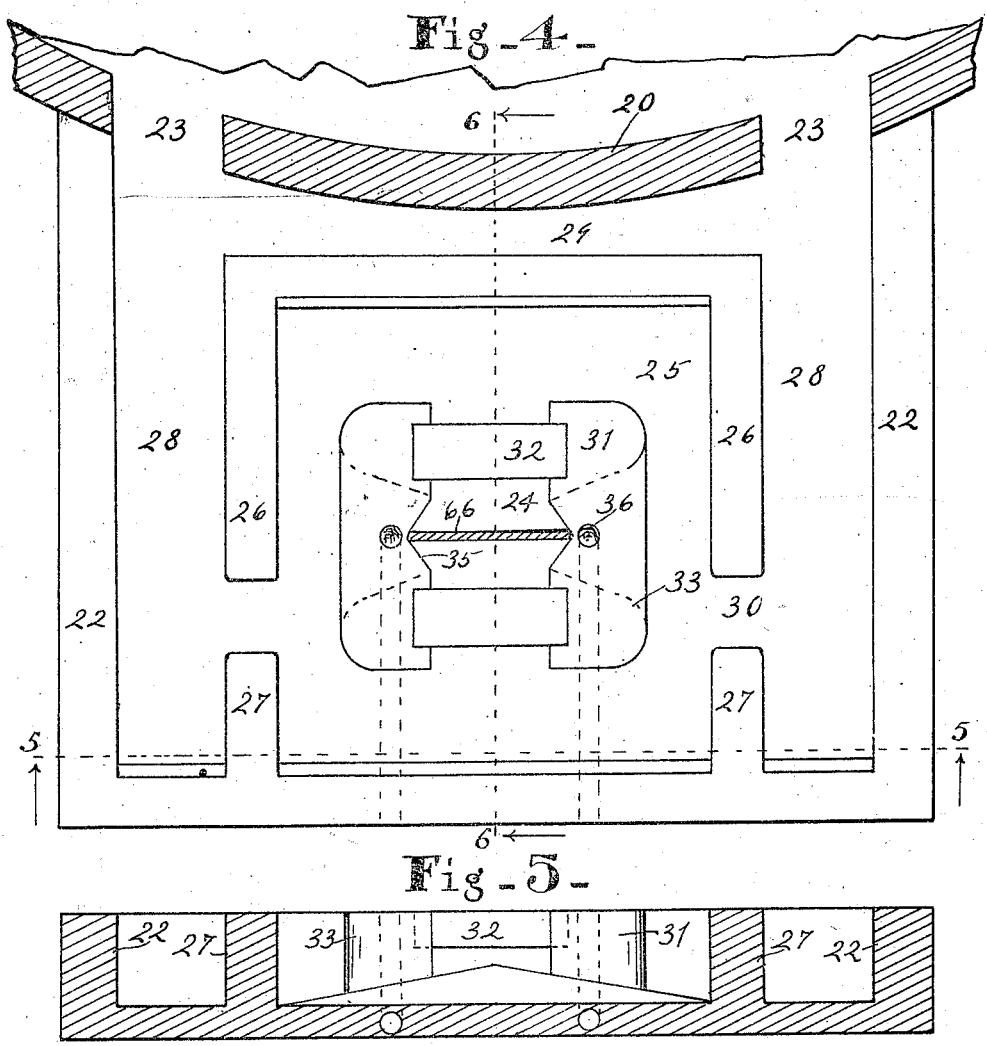

L. A. THORNBURG.
CONTINUOUS DRAWN SHEET GLASS MACHINE.
APPLICATION FILED SEPT. 5, 1907.
956,449.
Patented Apr. 26, 1910.
5 SHEETS—SHEET 4.
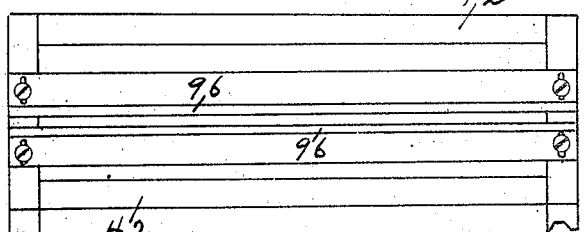
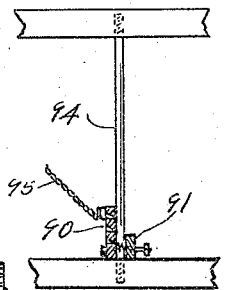
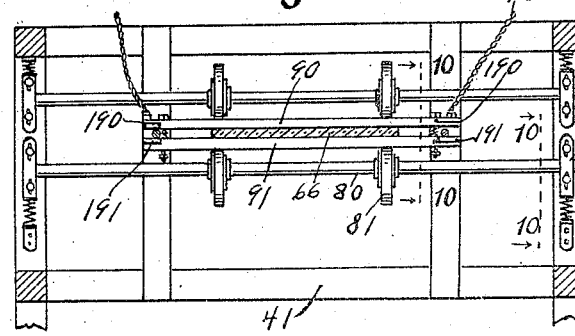
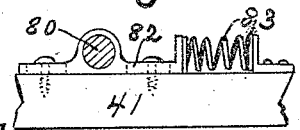
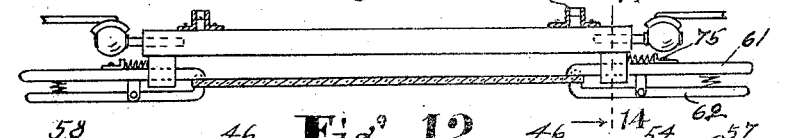
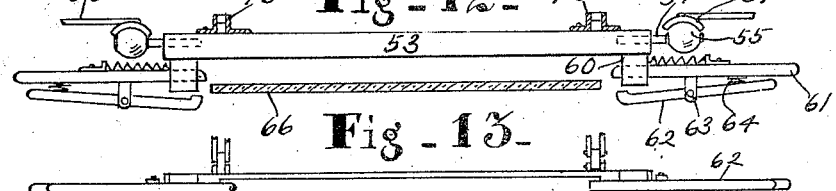
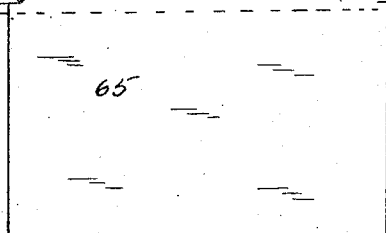
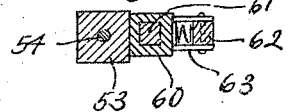
WITNESSES:
Olive Breeden
W. M. Gentle
INVENTOR.
Lincoln A Thornburg
BY
V. H. Lockwood
ATTORNEY.

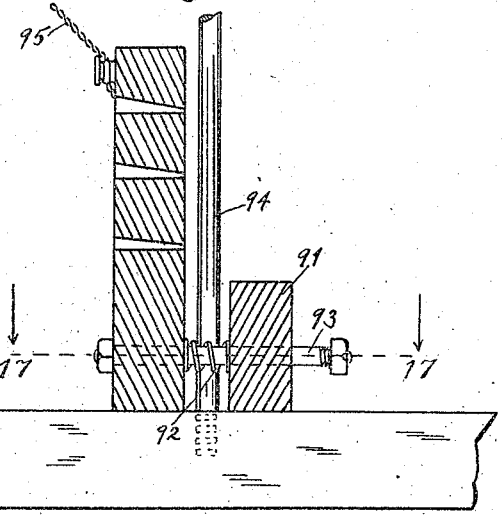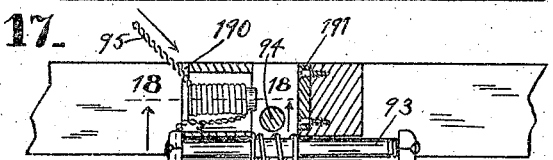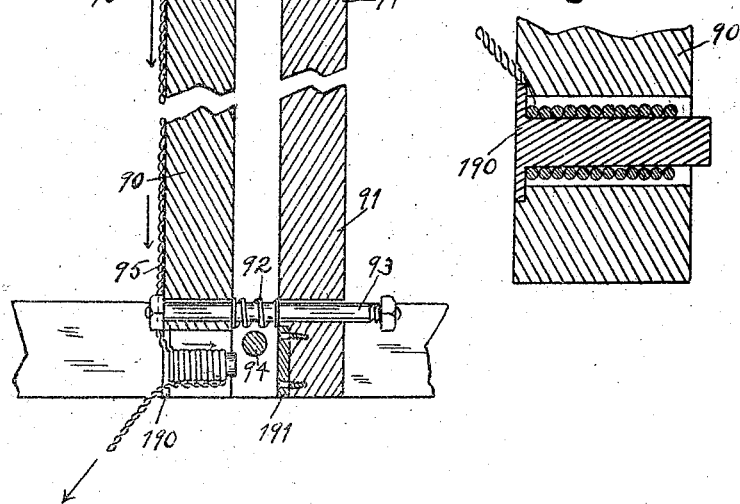

UNITED STATES PATENT OFFICE.

LINCOLN A. THORNBURG, OF HARTFORD CITY, INDIANA.

CONTINUOUS-DRAWN SHEET-GLASS MACHINE.

956,440.

Specification of Letters Patent. Patented Apr. 26, 1910.

Application filed September 5, 1907. Serial No. 391,465.

*To all whom it may concern:*

Be it known that I, LINCOLN A. THORNBURG, of Hartford City, county of Blackford, and State of Indiana, have invented a certain new and useful Continuous-Drawn Sheet-Glass Machine; and I do hereby declare that the following is a full, clear, and exact description thereof, reference being had to the accompanying drawings, in which like numerals refer to like parts.

The object of this invention is to provide a practical means for drawing sheet glass or plate glass.

One feature of the invention consists in the construction of the forehearth for the purpose, wherein the bottom slopes upwardly to the drawing point so that at that point the glass in the forehearth is more shallow and of even temperature. Furthermore, walls or partitions in the forehearth are provided to cause the glass to have a long distance to travel in reaching the drawing point so that it may become somewhat cool; also I protect the surface of the glass at the drawing point by a surrounding structure extending downward through the surface of the glass and into the same for a slight distance for holding back the top surface of the glass and allow the glass to be drawn from the bottom and thus have an even temperature and homogeneity or uniformity of character; also I provide an air passage-way along each lateral edge of the drawing point for cooling the lateral edges of the sheet of glass as it is being started.

Another feature of the invention consists in the mechanism for elevating the continuous sheet of glass. To that end a vertically moving endless conveyer is provided carrying spring controlled grips for holding the edges of the sheet of glass, said grips being longitudinally movable so that they may be moved out of and into position to engage the glass. Also the conveyer is provided with laterally extending ball bearings moving in suitable vertical guideways. Also means above said endless conveyer for further elevating the sheet of glass, said means consisting of oppositely mounted shafts carrying rubber friction wheels for engaging the surface of the glass and elevating the same, said shafts being spring-pressed toward each other.

Another feature of the invention consists in the cutting-off mechanism, a suitable electrically controlled rule being provided that clamps the sheet of glass at the point where the same is to be cut off and moves with it, while the workman is making the incisions in the sheet of glass. Above this electrical clamping rule breaking off bars are located over the edge of which the glass is broken off. In this connection said electrical clamping rule is provided with three slots through which diamond cutters may be operated for making three incisions so that the glass may be broken at the middle incision and the other incisions will prevent the cracking of the sheet of glass.

The nature of this invention will be understood from the accompanying drawings and the following description and claims.

Figure 2:
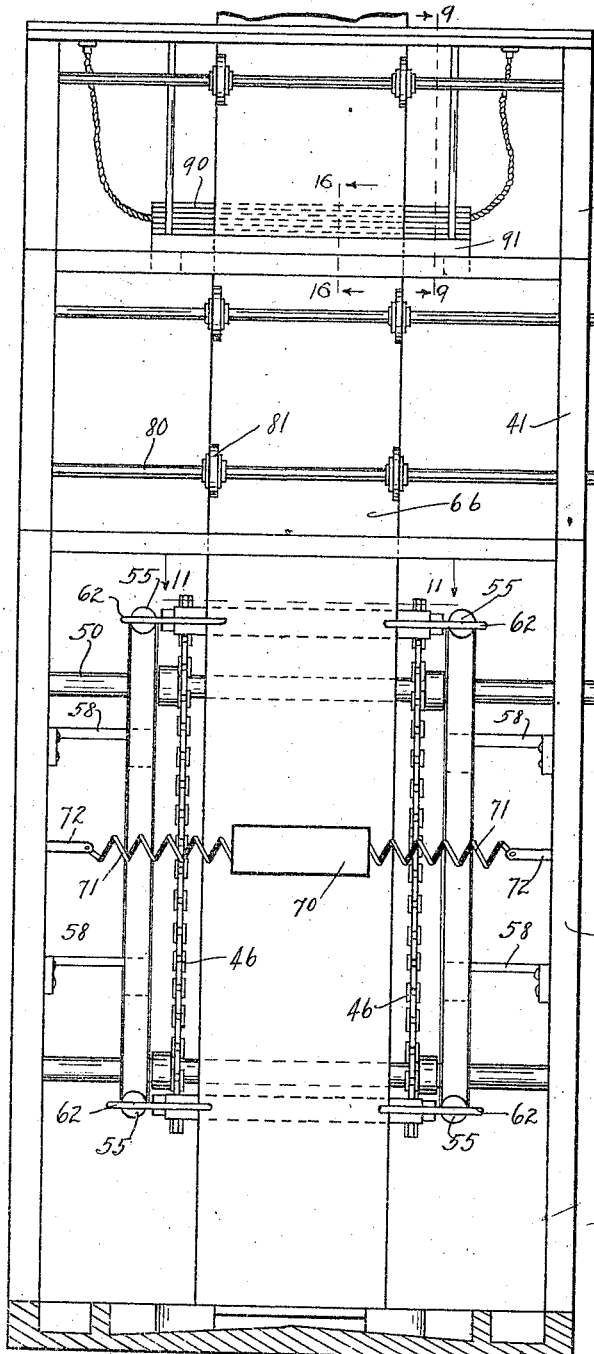
Figure 16:
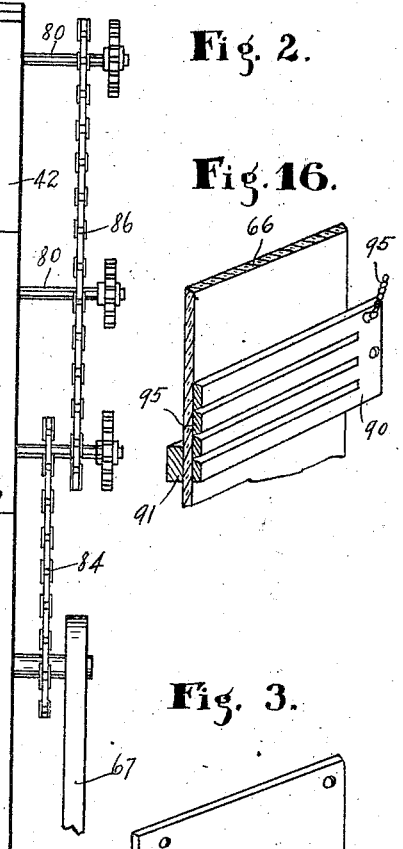
Figure 3:
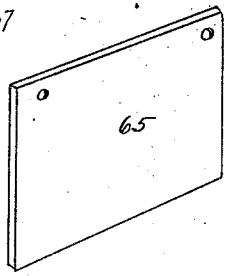

In the drawings Figure 1 is a side elevation of the apparatus, a part of the glass tank being broken away and parts shown in dotted lines. Fig. 2 is a section on the line 2—2 of Fig. 1 showing the sheet drawing mechanism in rear elevation. Fig. 3 is a perspective view of the starting plate. Fig. 4 is a horizontal section on the line 4—4 of Fig. 1, showing a plan view of the forehearth and a section of a part of the tank, the remainder of the tank being broken away. Fig. 5 is a vertical section transversely of the forehearth on the line 5—5 of Fig. 4. Fig. 6 is a vertical section on the line 6—6 of Fig. 4. Fig. 7 is a plan view of the top of the glass drawing mechanism, showing the cracking-off bar. Fig. 8 is a horizontal section on the line 8—8 of Fig. 1. Fig. 9 is a vertical section on the line 9—9 of Figs. 2 and 8. Fig. 10 is a section on the line 10—10 of Fig. 8, the parts being on a larger scale. Fig. 11 is a horizontal section on the line 11—11 of Fig. 2. Fig. 12 is the same as Fig. 11 with the grips released from the sheet of glass. Fig. 13 is a front elevation of the mechanism for starting the sheet of glass. Fig. 14 is a section on the line 14—14 of Fig. 11. Fig. 15 shows the lower part of Fig. 9 on an enlarged scale and with parts omitted and parts broken away, the parts shown being in an altered position. Fig. 16 is a perspective view of a part of the cutting-off mechanism, a portion being in vertical section on the line 16—16 of Fig. 2. Fig. 17 is a horizontal section through the device on the line 17—17 of Fig. 15, the same being, however, centrally broken away. Fig. 18 is a vertical section on the line 18—18 of Fig. 17.

While I do not wish to be limited to any particular details of construction, the device herein shown for the purpose of illustrating the nature of my invention is as follows.

To any suitable glass tank 20 a forehearth 21 is provided. The arrangement of this forehearth appears best in Figs. 4, 5, and 6. It consists of a bottom 11 that may be a lateral continuation of the bottom of the glass tank, and an outer surrounding wall 22 extending from the wall of the tank. Openings 23 in the wall of the tank are provided for permitting the molten glass to flow naturally into the forehearth. The chamber 24 is the drawing point or place from which the molten sheet of glass is drawn. To that point the bottom of the chamber 25 in the central part of the hearth slopes upwardly, as shown in Figs. 5 and 6. This chamber 25 of the hearth is separated by walls 26 and 27 from the chambers 28 leading from the openings 23 in the tank and the chamber 29 transversely connecting said chambers 28. Between the walls 26 and 27 there is a passage way 30 through which the glass flows from the chambers 28 into the central chamber 25. Within the central chamber 25 a pair of blocks 31 are built upwardly from the bottom to support the breakers 32. The breakers are plates or blocks that extend slightly below the surface of the molten glass and therefore there is ample space under them for the passage of the glass from the chamber 25 to the drawing point 24. Also the blocks 35 are centrally cut out on each side as indicated by the dotted lines 33, in Fig. 4, to form a horizontal passage way 34 below the tops of each block, as indicated in Fig. 6, and through which the glass also flows from the chamber 25 to the drawing point 24.

The gradual elevation of the bottom of the forehearth to the drawing point causes the glass to become more shallow and of even temperature as it reaches the drawing point. The walls 26 are near the glass tank where the glass is hottest and their forward ends project forwardly and beyond the drawing point so that the molten glass will have a long distance to flow to the drawing and will become cooler. The walls 27 have substantially the same function. The blocks 31 and breakers 32 both project above the level of the glass so that at the drawing point they constitute a wall about the surface of the glass for the purpose of holding back the top surface of the glass in the chambers 25 and 28 and allow the glass to be drawn from the bottom or from below the surface where the glass is of more even temperature and homogeneous or of uniform character.

The opposing faces of the blocks 31 have vertically disposed V-shaped grooves 35 for holding the edges of the sheet of glass while being started. Immediately to each side of the apex of these V-shaped grooves and within the blocks 31 there is a vertically disposed air passage 36 formed of a pipe extending down into the bottom of the forehearth and then horizontally to the open air. These air passages are for the purpose of stiffening the sheet of glass on its lateral edges as it is being started.

Above the forehearth described a sheet glass drawing mechanism is mounted, they being here described as three rectangular frames, a lower one 40, a middle one 41 and an upper one 42. The lower frame has lateral beams 43 on which shaft 50 for sprocket wheels 44 and 45 are mounted, one above and one below the other for carrying sprocket chains 46. The sprocket wheels 44 are driven by a belt 47 from the shaft on a motor 48, said belt running over the pulley 49 and the shaft 50, on which said sprocket wheels are secured. The two sprocket chains carry a number, here four, of sets of grips, as shown in Figs. 11 and 12. There is a cross bar 53 secured to the chains 46 carrying in its ends rods 54 the ball shaped rollers 55 running in vertical guides 57 carried on the arms 58 that is secured on the side beams on the frame 40, see Fig. 2. A block 60 is secured on the outer side of each bar 53 near each end, see Fig. 14, that has a square central aperture through which one member 61 of the grip is mounted so as to be longitudinally slidable therein. Each grip consists of this member 61 and a parallel companion member 62 fulcrumed to a pair of fulcrum bars 63 secured to the members 61. A spring 64 is secured to said members 61 and 63 so as to tend to push their outer ends apart and their inner ends together, whereby the inner ends may grasp the starting plate 65 on the sheet of glass, as shown in Fig. 11 and be released and withdrawn as shown in Fig. 12, this latter being done by hand.

It is obvious that as the mechanism operates, the chain 46 will be operated in the direction of the arrows and at least two of the sets of grips will be on the front side of the conveyer and in a vertical line over the drawing point 24 in the forehearth below. For starting the glass the starting plate 65 is placed in the set of grips with the lower end of the starting plate extending down into the glass in the forehearth. The plate 65 being cool, relatively, the glass adheres to it. The mechanism is then started and operated slowly and as the starting plate rises it will draw up the sheet of glass 66. As the same proceeds the sheet of glass will be drawn vertically between a pair of blocks 70 held by the springs 71 connected to the arms 72 which are fastened to the side of the frame 40. The purpose of the blocks 70 is to hold the sheet of glass straight and prevent it warping while it is still somewhat flexible. When the sheet of glass is drawn far enough the following set of grips engage its edges, the springs 64 causing the grips to hold it tightly and the springs 75, see Fig. 11, which are secured to the member 61 of the grip and to the block 60, tend to draw the grip longitudinally toward the sheet of glass and hold it in place. This process continues so as to continuously draw the sheet of glass and move it vertically.

In the frame 41 above the frame 40 there are a plurality of means for engaging the glass and further moving it upward while it cools. These consist of shafts 80 and rubber friction wheels 81 placed close together so as to grip a sheet of glass and move it upward. These rods are mounted in sliding bearings 82 on horizontal parts of the frame, which bearings are pressed toward each other by the springs 83 so as to cause the wheels 81 to tightly grip the sheet of glass. They are driven by a sprocket chain 84 running from the sprocket wheel on the shaft 50 to the sprocket wheel on one of the rods 80 and a sprocket chain 86 running from the sprocket wheels on said rod 80, to sprocket wheels on the rods 80 above. This drives one vertical series of rods 80 and the other series are driven through the gears 85 on the ends of each pair of rods 80 and which inter-mesh.

The glass becomes hard by the time it passes through the frame 41 and in the frame 42 above it is cut in sheets and while it is still moving vertically upon the upper cross timbers of the frame 41, a wooden bar or rule 90 is placed transversely and unsecured. A companion bar 91 made of wood is similarly placed parallel with the rule 90 so that the sheet of glass will pass between said bars 90 and 91. They are normally held apart from each other to admit the glass by springs 92 between them and on the rods 93 which extend loosely through said bars 90 and 91. Said bars are located with their ends on opposite sides of vertical guide rods extending from the bottom to the top of the ends of the top frame 42.
Electrical conductors 95 extend to steel plates 190 on the rule 90 and magnets 191 are secured on the ends of bar 91 so that when there is a current through said conductors 95 the bars 90 and 91 will be drawn together to clamp the sheet of glass. The rule 90 is clamped by the operator at the exact point where he wishes to cut the sheet of glass and as the sheet of glass moves upward carrying the clamped bars 90 and 91 with it he runs his cutter or diamond transversely across the face of the sheet of glass. This rule 90, as seen in Fig. 16, is formed of three slots extending horizontally for a portion of the length thereof so that a cutter with three diamonds may be simultaneously moved and operated through said slots to make three parallel scores in the glass. This is for the purpose of enabling the glass to be broken away along the line of the middle score on each side of said middle line, which will prevent the cracking of the glass. As the glass feeds upward and passes between the pair of transverse bars 96 mounted on the top of the frame 42 and when the middle score in the glass made by the cutter reaches the upper edges of said bars 96 the sheet of glass is broken away and removed to the bar. The bars 96 therefore afford an edge over which the glass may be severed. After the sheet of glass has been started by means of the starting plate 65, said plate is removed and need not be again used until it is necessary to again start a sheet of glass.

What I claim as my invention and desire to secure by Letters Patent is:

1. A forehearth for a glass tank having a point from which a continuous sheet of glass may be drawn, a pair of oppositely located blocks extending up from the bottom of the forehearth above the surface of the molten glass in the forehearth, one on each side of the drawing point, and each block having a central opening through the lower part thereof to the drawing point, and plates extending between the opposite ends of said blocks that do not extend to the bottom of the forehearth for forming a protecting wall in the surface of the glass around the drawing point.

2. A forehearth for a glass tank from which a continuous sheet of glass may be drawn, blocks in said forehearth on each side of the drawing point, and air pipes extending upward in said forehearth near the lateral edges of the drawing point, whereby air passing through said pipes will chill the glass near the edges of the sheet while being started.

3. A continuous sheet glass drawing device including vertically moving endless conveyer chains, cross bars secured at intervals to said chains, arms extending from the ends of said cross bars, rotatable balls on the ends of said arms, vertical guides in which said balls move, and grips secured to said cross bars for gripping the edges of the sheet of glass and elevating it.

4. A continuous sheet glass drawing device including vertically movable endless chains, cross bars secured at intervals thereto, horizontally extending grips mounted in connection with said bars so as to be slidable toward and away from the sheet of glass being elevated, and springs for forcing said grips toward the sheet of glass.

5. A continuous sheet glass drawing device including a vertically disposed elevator, blocks secured thereto with angular openings in them, grips consisting of two members fulcrumed together, one of said members being longitudinally slidable in one of said blocks, a spring tending to force the ends of said grip members together, and a spring connecting said grip and block that tends to force the grip toward the sheet of glass being elevated.

6. A continuous sheet glass drawing device including means for vertically elevating the sheet of glass, a pair of parallel blocks between which the sheet of glass moves, and horizontal springs extending from the frame-work of the device to the ends of said blocks, whereby they are suspended, substantially as set forth.

7. A continuous sheet glass drawing device including means for elevating the drawn sheet of glass vertically, a rule, and means for clamping it transversely to the sheet of glass, whereby it will move with the sheet of glass and furnish a guide for a cutter.

8. A continuous sheet glass drawing device including means for elevating the drawn sheet of glass vertically, a rule extending transversely of said sheet of glass, and electrical means for clamping said rule to the sheet of glass so it will travel therewith.

9. A continuous sheet glass drawing device including means for elevating the drawn sheet of glass vertically, a wooden rule placed transversely of the sheet of glass with a steel plate on each end, electrical connection with the metal ends of said rule, a wooden bar located on the opposite side of the sheet of glass and rule and parallel with the rule and having a soft iron plate on each end, and means for loosely holding said rule and bar relatively in place, whereby the electrical current will draw the rule and bar toward each other and clamp them on the sheet of glass.

10. A continuous sheet glass drawing device including means for elevating the drawn sheet of glass vertically, a wooden rule placed transversely of the sheet of glass with a steel plate on each end, electrical connection with the metal ends of said rule, a wooden bar located on the opposite side of the sheet of glass and rule and parallel with the rule and having a soft iron plate on each end, bolts extending loosely through said rule and bar so they will be held in proper relation with each other and can move toward and from each other, and a spring tending to force them apart, substantially as set forth.

11. A continuous sheet glass drawing device including means for elevating the drawn sheet of glass vertically, a wooden rule placed transversely of the sheet of glass, with a steel plate on each end electrical connection with the metal ends of said rule, a wooden bar located on the opposite side of the sheet of glass and rule and parallel with the rule, and having a soft iron plate on each end means for holding said rule and bar relatively in place, whereby the electrical current will draw the rule and bar toward each other and clamp them on the sheet of glass, and a vertically disposed guide rod between the ends of said rule and bar, substantially as set forth.

12. A continuous sheet glass drawing device including means for elevating the drawn sheet of glass vertically, a rule disposed transversely of the sheet of glass, and means for clamping the rule to the sheet of glass, said rule being provided with a plurality of slots through which glass cutters may be operated, whereby three horizontal incisions will be made in the sheet of glass.

13. A continuous sheet glass drawing device including means for elevating the drawn sheet of glass vertically, means for cutting a horizontal transverse incision in the sheet of glass while it is being elevated, and a pair of breaking-off bars above the cutting mechanism between which the sheet of glass moves, whereby the sheet may be broken off after it has been cut.

In witness whereof, I have hereunto affixed my signature in the presence of the witnesses herein named.

LINCOLN A. ×^{his}_{mark} THORNBURG.

Witnesses:
 THOMAS R. MOORE,
 M. C. LEWIS.